(12) United States Patent
Spencer-Purvis

(10) Patent No.: US 6,314,982 B1
(45) Date of Patent: Nov. 13, 2001

(54) LINK APPARATUS

(75) Inventor: Gary Spencer-Purvis, Preston (GB)

(73) Assignee: BAE Systems plc, Farnborough (GB)

( * ) Notice: Subject to any disclaimer, the term of this patent is extended or adjusted under 35 U.S.C. 154(b) by 0 days.

(21) Appl. No.: 08/951,516

(22) Filed: Oct. 16, 1997

Related U.S. Application Data

(63) Continuation of application No. 08/441,279, filed on May 15, 1995, now abandoned.

(30) Foreign Application Priority Data

May 14, 1994 (GB) .................................................. 9409720

(51) Int. Cl.[7] ............................. F16K 17/40; B64D 25/10
(52) U.S. Cl. ................................. 137/68.16; 137/625.26; 244/122 AF
(58) Field of Search ............................. 137/68.11, 68.16, 137/625.26; 244/122 AE, 122 AF

(56) References Cited

U.S. PATENT DOCUMENTS

| | | | |
|---|---|---|---|
| 789,971 | * 5/1905 | Harrington | 137/625.26 |
| 3,466,062 | 9/1969 | Deplante | 285/145.2 |
| 3,473,557 | * 10/1969 | Loe | 137/625.26 X |
| 3,608,584 | * 9/1971 | Vaughn | 137/625.26 |
| 4,613,101 | 9/1986 | Herndon | 244/122 R |
| 5,261,454 | 11/1993 | Pavlica et al. | 137/625.48 |
| 5,370,522 | * 12/1994 | Lindner | 137/625.26 X |

* cited by examiner

*Primary Examiner*—John Rivell
(74) *Attorney, Agent, or Firm*—Pillsbury Winthrop LLP

(57) ABSTRACT

An extendable/retractable link apparatus 10 defines a fluid passage therethrough and may be connected between two relatively moveable components, e.g. an aircraft ejector seat and the adjacent fixed airframe, so that, when there is relative movement within pre-set limits, there is no significant displacement of fluid and no significant pressure force generated. The apparatus comprises a body 12 defining a fluid inlet/outlet port 16 and slidably receiving a piston 18 having a central bore which defines a fluid inlet/outlet port 24. The fluid passage is defined between said inlet and outlet ports 16 and 24. Relative movement of the piston 18 and the body 12 does not cause significant displacement of the fluid into or out of the fluid passage.

9 Claims, 2 Drawing Sheets

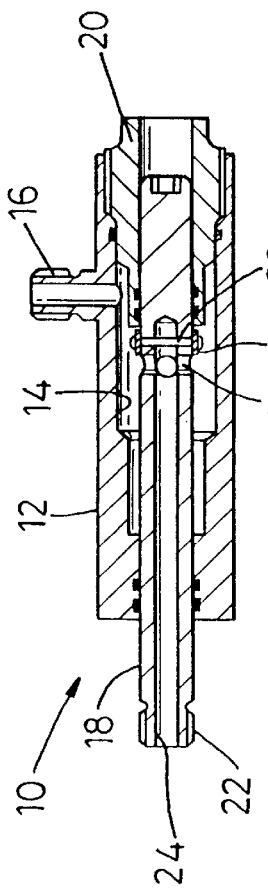
Fig. 1
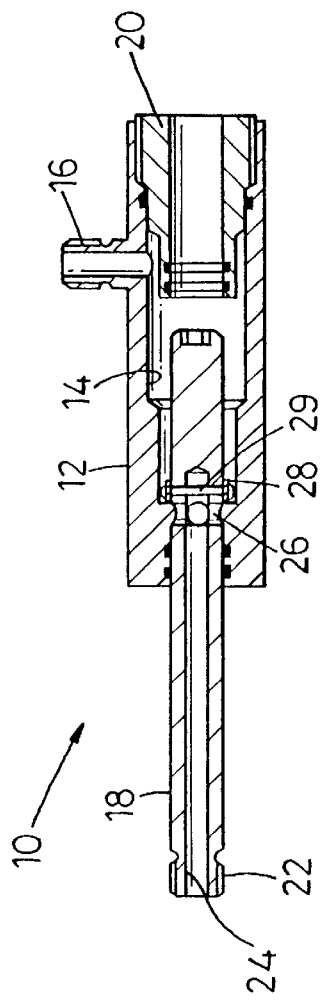
Fig. 2
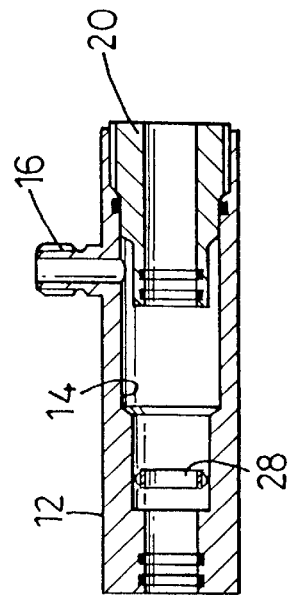
Fig. 3
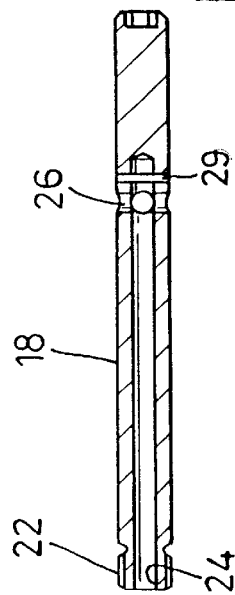

LINK APPARATUS

This is a continuation of application Ser. No. 08/441,279, filed on May 15, 1995, which was abandoned upon the filing hereof.

This invention relates to a link apparatus capable of accommodating relative extension and/or retraction, and defining a fluid passage.

In existing examples of such apparatus, extension or retraction of the apparatus may displace fluid into or out of the apparatus with a possible increase or decrease in fluid pressure. This can cause difficulties as the variation in pressure and/or fluid displacement may have undesirable effects elsewhere in the system. For example, if the link is in a fluid logic circuit, the variation in fluid pressure due to extension or retraction may be misinterpreted as a pressure signalling pulse. Whilst there are many different applications for such apparatus, a particular application of interest to the applicants is the telescopic "trombone" unit which extends between an ejector seat and the airframe in a military aircraft. This unit is required to transmit a signal in the form of a pressure pulse or a shock wave from the seat to a canopy jettison unit during an emergency ejection procedure. In normal operation the unit must accommodate limited extension and retraction movement due to relative movement, e.g. due to differential thermal expansion etc, but this must not produce anything that might be seen as a pressure pulse, otherwise there could be disastrous consequences.

Accordingly, this invention provides a fluid link apparatus capable of extension and/or retraction, and comprising a body element and a piston means housed at least partially within said body element and slidably moveable along an extension/retraction axis, the body element and the piston element each having a fluid inlet/outlet port, and the apparatus including fluid passage means connecting said inlet/outlet ports, said passage means being configured so that the net displacement of fluid between said inlet port and said outlet port upon extension or retraction within pre-set limits is nil or relatively low.

Preferably, said body element includes two seal regions which seal against the piston element at longitudinally spaced locations and allow sliding movement of said piston element, and define between them a confined volume.

The piston element preferably includes a generally longitudinal bore extending from its distal end and terminated by at least one generally transverse bore opening into a region of said body element between said two seal regions.

The piston means conveniently includes a collar element arranged to cooperate with said seal regions to limit routine extension and/or retraction movement of the piston means, and the collar element may be releasably attached to said piston means by a frangible connection to allow removal thereof and to allow separation of said piston element and said body element.

The piston means is advantageously movable into a position in which the portion of the passage leading from the piston inlet/outlet port is blocked, but the portion of the passage leading from the body inlet/outlet port is vented to the exterior of the body element.

The piston means and said body element may each include attachment means for attachment to a respective structural component, for example an ejector seat and the airframe in an aircraft, respectively.

In one embodiment, said inlet/outlet ports extend generally perpendicularly, whilst in another said inlet/outlet ports are generally in-line.

Whilst the invention has been described above it extends to any inventive combination of the features set out above, or in the following description or claims.

The invention may be performed in various ways and, by way of example only, two embodiments thereof will now be described in detail, reference being made to the accompanying drawings, in which:

FIG. 1 is a side section view showing a first embodiment of link unit in accordance with the invention;

FIG. 2 is a side view of the link unit of FIG. 1 in an extended position, just before separation;

FIG. 3 is a side view of the unit of FIGS. 1 and 2 after disconnection;

Figure 4:
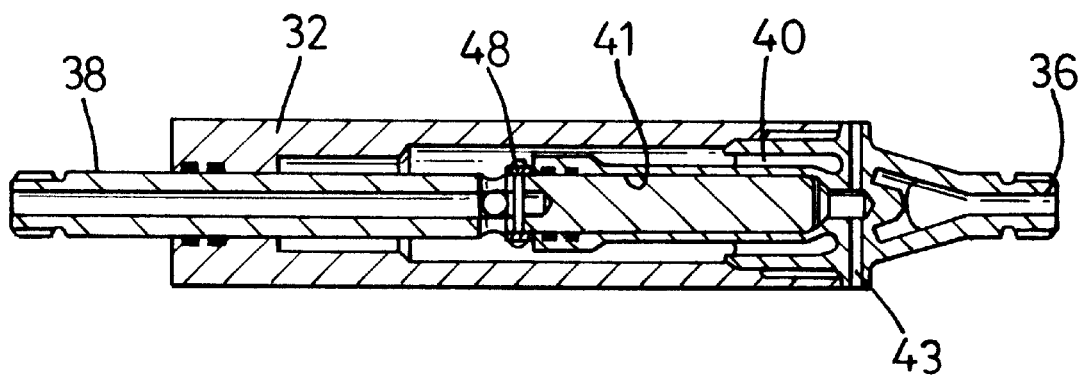
FIG. 4 is a side view of a second embodiment of link unit in accordance with the invention.

Referring to the drawings, the embodiments of link unit illustrated there are intended to extend between the ejector seat and the airframe in a military aircraft. When the pilot initiates ejection, a pressure signal is generated on board the seat which needs to be transmitted to a canopy jettison initiator unit. The link unit is also required to accommodate relative movement during the initial moments of ejection.

Referring initially to FIGS. 1 to 3, the first embodiment of link unit 10 comprises a generally cylindrical body 12 with a stepped internal bore 14 and a transverse outlet port 16 communicating with the bore. Through one end of the body 12 (the left hand end as viewed) projects one end of a piston 18, and the other end of the body 12 is closed by a hollow cylindrical plug 20 which slidably and sealably receives the other end of the piston 18. The free end of the piston is pivotally secured to the ejection seat, and the body 12 is secured to the airframe or a part associated therewith.

The piston 18 is of uniform outer diameter apart from the left hand end which terminates in an inlet port 22. The inlet port 22 continues as a longitudinal passage 24 extending about two thirds along the length of the piston 18. Shortly before the end of the passage 24, there are provided two transverse drillways 26 at 90° to each other. Immediately behind the drillways 26 a collar 28 is secured to the piston 18 by a shear rivet 29.

When in the position shown in FIG. 1, the inlet and outlet ports 22, 16 are in communication and the link unit may extend to accommodate movement. Because the other end of the piston 18 is received in the plug 20, when the unit 10 begins to extend, there is no net displacement of the volume of fluid within the unit, at least until the end leaves the plug 20. Thus, up to that stage, extension and retraction may occur without displacing fluid from the link and without causing an increase or a decrease in the pressure to either side of the unit. Conversely, the fluid pressure acting between the inlet and the outlet does not generate any significant extension or retraction force or significantly affect extension or retraction movement, and so 100% pressure balance may be achieved.

Once ejection has been initiated, a pressure pulse generated by a pyrotechnic unit on board the seat is transmitted by the link unit 10 to initiate canopy jettison. Almost simultaneously, the ejection seat begins to move relative to the aircraft structure and so the piston 18 extends relative to the body 12 until the collar 28 engages the shoulder 30 of the stepped bore of the body, as seen in FIG. 2.

In this position, the piston drillways 26 are blocked by the leftmost bore of the housing thus containing the seat-side pressure in the body, whilst the aircraft airframe side pressure is free to bleed to atmosphere via the hollow plug 20.

Further ejection movement of the seat causes the shear rivet 29 to shear and the piston 18 to slide clear of the body 12 leaving the rivet in the body. The seat-side pressure is free to bleed to atmosphere via the drillways 26 which are mutually opposing and so do not generate any net "rocket" force.

Referring now to FIG. 4, the second embodiment is an in-line unit but has generally similar features to the first embodiment. The body 32 is stepped as before but instead of being transverse, the outlet port 36 is in-line and forms part of the plug 40 which closes the body 32. The plug 40 has a central stem defining an inner bore 41 which receives the other end of the piston 38 which is similar in all respects to the piston 18 of the first embodiment, including the collar 48. The inner bore 41 connects via vent passage 43 to atmosphere. Operation of this second embodiment is essentially similar to that of the first embodiment.

Figure 5:
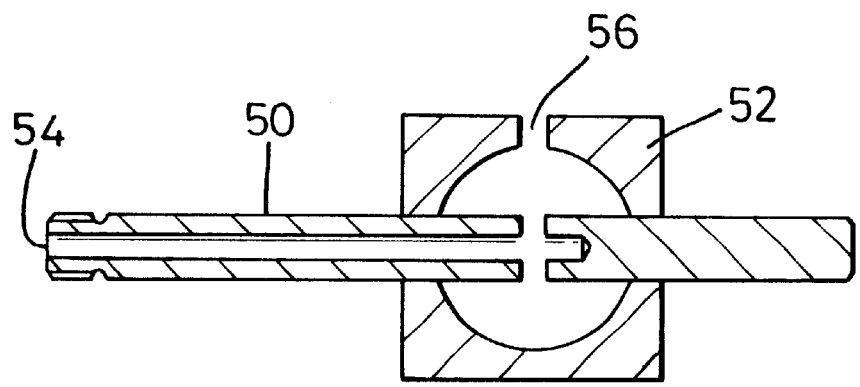
FIG. 5 is a diagrammatic representation of the principle governing the embodiments of FIGS. 1 to 3 and 4.

Referring to FIG. 5, this illustrates diagrammatically the principle of operation of the first two embodiments. The piston 50 is slidably mounted in the body 52 and there is a fluid passage connecting the inlet port 54 on the piston and the outlet port 56 on the body. The piston can slide relative to the body without displacing fluid to or from the unit. In effect movement of an increment of the length of the piston out of the chamber is compensated by equal movement into the chamber.

What is claimed is:

1. A fluid link apparatus comprising:
   a body element,
   a piston element housed at least partially within said body element and slidably movable along an extension/retraction axis,
   a body element fluid port
   a piston element fluid port, and
   fluid passage means connecting said body element fluid port and said piston element fluid port,
   said fluid passage means being configured so that the net displacement of fluid between said body element fluid port and said piston element fluid port upon extension or retraction of said piston element relative to said body element within pre-set limits is nil or relatively low,
   wherein said body element includes two seal regions which seal against the piston element at longitudinally spaced locations and allow sliding movement of said piston element, and
   the piston element includes a collar element arranged to co-operate with said seal regions to limit routine extension movement of the piston element.

2. Link apparatus according to claim 1, wherein said piston element includes a generally longitudinal bore extending from its distal end and terminated by at least one generally transverse bore opening into a region of said body element between said two seal regions.

3. Link apparatus according to claim 1, wherein said collar element is releasably attached to said piston element by a frangible connection to allow removal thereof and to allow separation of said piston element and said body element.

4. Link apparatus according to claim 2, wherein said piston element is movable into a position in which a portion of the passage leading from the piston element is blocked, but a portion of the passage leading from the body element is vented to the exterior of the body element.

5. Link apparatus according to claim 4, wherein said piston means and said body element each include attachment means for attachment to a respective structural component.

6. Link apparatus according to claim 2, wherein said structural components comprise an ejector seat and an aircraft airframe.

7. Link apparatus according to claim 4, wherein said ports extend generally perpendicularly.

8. Link apparatus according to claim 7, wherein said ports are generally in-line.

9. An aircraft ejector seat assembly comprising:
   an ejector ejectably mounted with respect to an airframe structure, fluid link apparatus extending between said ejector seat and said airframe,
   said link apparatus being capable of extension and/or retraction and including a body element connected to one of said airframe structure and said ejector seat,
   a piston element connected to the other of said airframe structure and said ejector seat,
   said piston element being housed at least partially within said body element and being slidably moveable along an extension/retraction axis,
   the body element and the piston element each having a fluid port, and
   fluid passage means connected said body element port and said piston element port,
   said passage means being configured so that the net displacement of fluid between said body element port and said piston element port upon extension or retraction of said piston element relative to said body element within preset limits is nil or relative low.

\* \* \* \* \*